Sept. 24, 1968    R. D. HALE ETAL    3,402,536
SLOPE MOWER VEHICLE
Filed Aug. 10, 1967    4 Sheets-Sheet 1
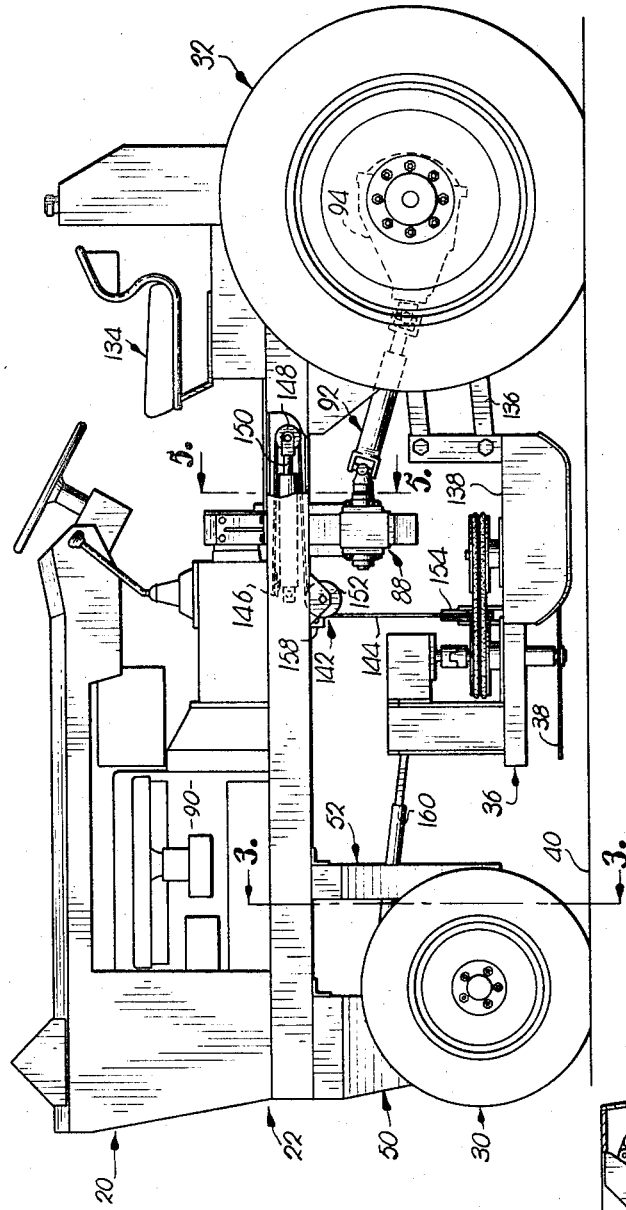
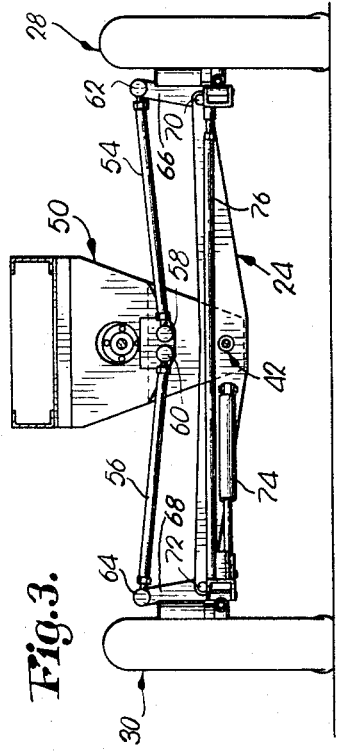
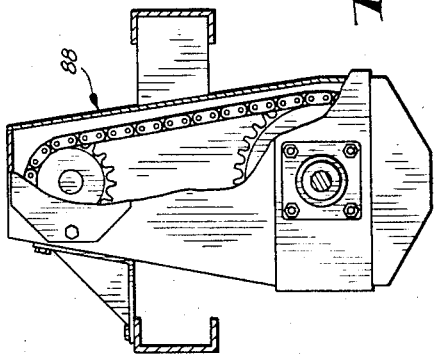
INVENTORS.
Ralph D. Hale
Roy S. Lowrey
Robert I. Denny
John R. Wedman
BY Schmidt, Johnson, Hovey,
Williams & Bradley
ATTORNEYS.

Sept. 24, 1968   R. D. HALE ETAL   3,402,536
SLOPE MOWER VEHICLE

Filed Aug. 10, 1967   4 Sheets-Sheet 2

INVENTORS.
Ralph D. Hale
Roy S. Lowrey
Robert I. Denny
John R. Wedman

BY Schmidt, Johnson, Hovey, Williams & Bradley
ATTORNEYS.

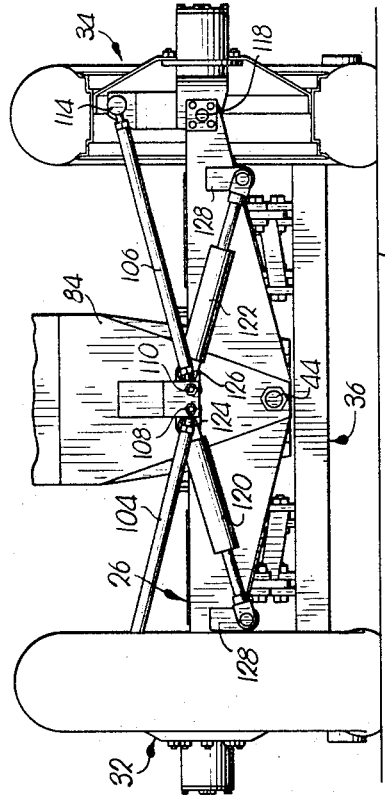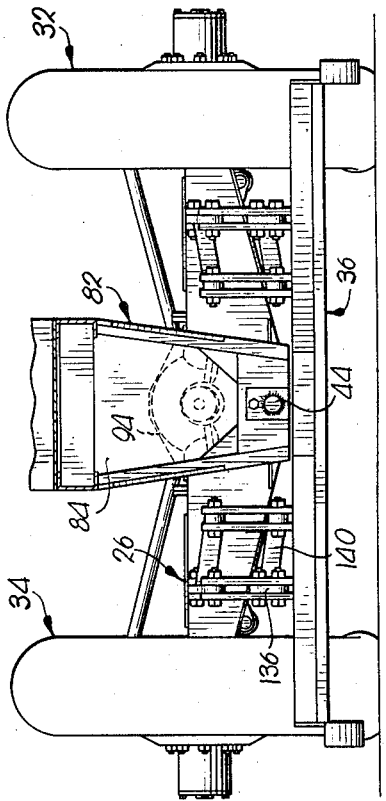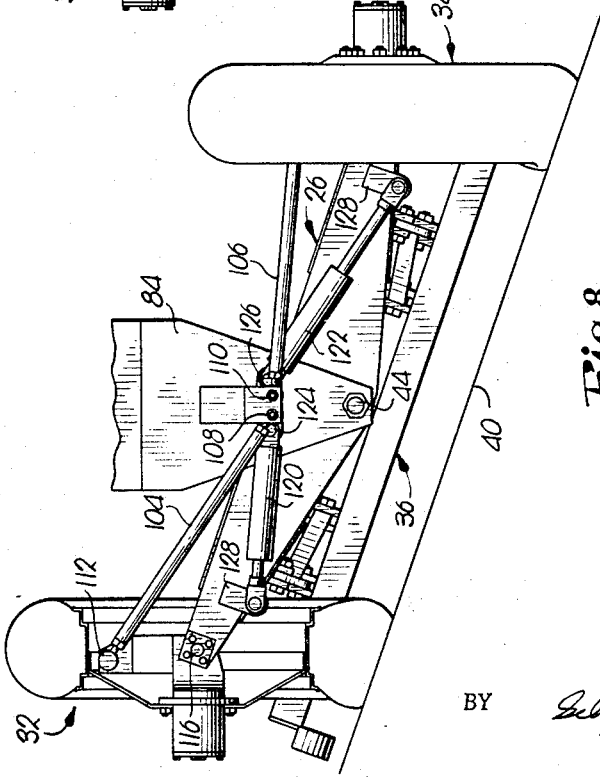

United States Patent Office 3,402,536
Patented Sept. 24, 1968

3,402,536
SLOPE MOWER VEHICLE
Ralph D. Hale, Carthage, Mo., and Roy S. Lowrey, Argonia, Robert I. Denny, Harper, and John R. Wedman, Argonia, Kans., assignors to Slope Tractor, Inc., Harper, Kans., a corporation of Kansas
Filed Aug. 10, 1967, Ser. No. 659,674
10 Claims. (Cl. 56—25.4)

ABSTRACT OF THE DISCLOSURE

A vehicle in the nature of a tractor having a mower unit carried thereby, the tractor having the longitudinally disposed body thereof pivotally mounted upon axle members disposed transversely of the body, there being piston and cylinder assemblies coupling the body with one axle member so that when the tractor is utilized to mow a slope, the body may be maintained in a vertical position notwithstanding the fact that the axles are in parallel relationship to the inclined surface upon which the tractor is working. The mower unit is carried beneath the body of the tractor and connected thereto by adjustable suspension apparatus to permit shifting of the mower unit in a vertical path. Linkage means couple the mower unit to one axle member of the tractor so that when a slope is being mowed, the mower unit shifts with said axle member and is maintained in a position parallel to the slope.

---

This invention relates to a slope mower vehicle, in the nature of a tractor, having a mower unit of the rotary type disposed therebeneath, which vehicle is particularly intended for use on hillsides, inclines or the like, which are to be mowed but which present a substantial danger if conventional mowing equipment is utilized, due to the angle of inclination of the slope.

It is, therefore, the primary object of this invention to provide a vehicle having the longitudinally disposed body thereof pivotally connected to its transversely disposed, supporting axle members in such a manner that, when the vehicle is operated on a slope and the axles assume a substantially parallel relationship to the inclined slope, the body may be rocked, through utilization of piston and cylinder assemblies, from a position of initial inclination to a position disposed substantially vertically, whereby the operator of the vehicle is maintained in an upright position.

A yet further important aim of this invention is to provide, in a vehicle of the type described above, a mower unit which is coupled to the vehicle in such a manner that the mower unit is at all times maintained in parallel relationship to the surface of the slope on which the tractor is mowing. This is accomplished through the utilization of a suspension apparatus coupling the mower unit to the body and by providing linkage coupling the mower unit to the rear axle of the tractor, so that the mower unit shifts with the axle, the rear axle being pivoted to the body and to its wheel assemblies in such a manner that the mower is always maintained parallel to the surface over which the vehicle is operating.

Other important objects of this invention include structural features such as the placement and disposition of the pivot points for the axle assemblies; the positioning of the pivot points for the tie bars which couple the wheel assemblies to the body; the relationship of various pivot points; and other significant aspects which will become apparent from the following specification and accompanying drawings, wherein:

FIGURE 1 is a side elevational view of the slope mower vehicle;

FIG. 3 is a view taken on line 3—3 of FIG. 1;

FIG. 5 is an enlarged, partially sectional view taken on line 5—5 of FIG. 1, parts being broken away to disclose details of construction;

FIG. 6 is a fragmentary, rear elevational view of the vehicle, parts being broken away to reveal details of construction;

FIG. 7 is a fragmentary, front elevational view of the rear axle and its wheel assemblies;

FIG. 8 is a fragmentary, rear elevational view showing the vehicle in use upon a slope with the rear axle and mower being tilted and the body vertical;

Figure 2:
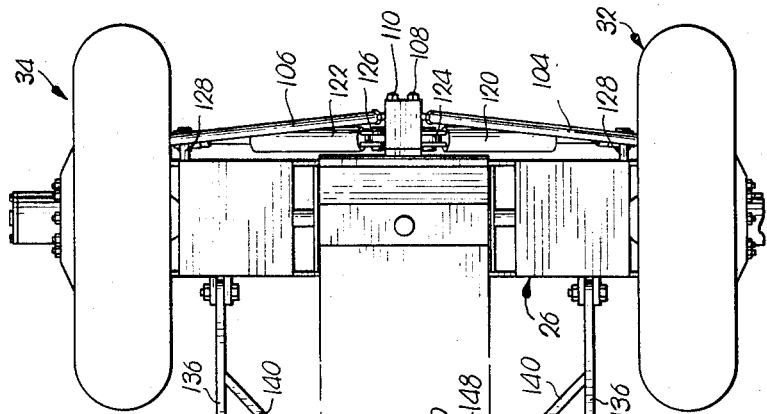
FIG. 2 is a top plan view thereof, portions being broken away to reveal details of construction.

The vehicle 20 is in the form of a tractor having a longitudinally disposed body 22 supported by transversely disposed axle members, the embodiment chosen for illustration having a front axle 24 and a rear axle 26. Front axle 24 has corresponding wheel assemblies 28 and 30 carried at the outer ends thereof, and rear axle 26 has corresponding wheel assemblies 32 and 34 carried at the outer ends thereof. A mower unit 36 is disposed beneath the body 22 and at a position between front axle 24 and rear axle 26, the mower unit 36 being of the rotary type and having a plurality of blades 38 which rotate in a horizontal plane whereby to cut the vegetation growing upon surface 40 upon which the vehicle 20 is operated.

As indicated above, vehicle 20 is primarily intended for use on inclined, sloping surfaces such as hillsides or the like and such as are commonly found along highway right-of-ways where the earth has been graded to develop the roadway. In order to particularly accommodate vehicle 20 for use in mowing slopes, the longitudinally disposed body 22 is pivotally secured to front axle 24 by pivot member 42 and is pivotally secured to rear axle 26 by pivot member 44, all to the end that the body 22 may be rocked about said pivot members 42 and 44 to maintain the body 22 in a substantially vertical position notwithstanding the fact that the axles 24 and 26 assume a position substantially parallel to the slope upon which the vehicle is being operated.

Figure 4:
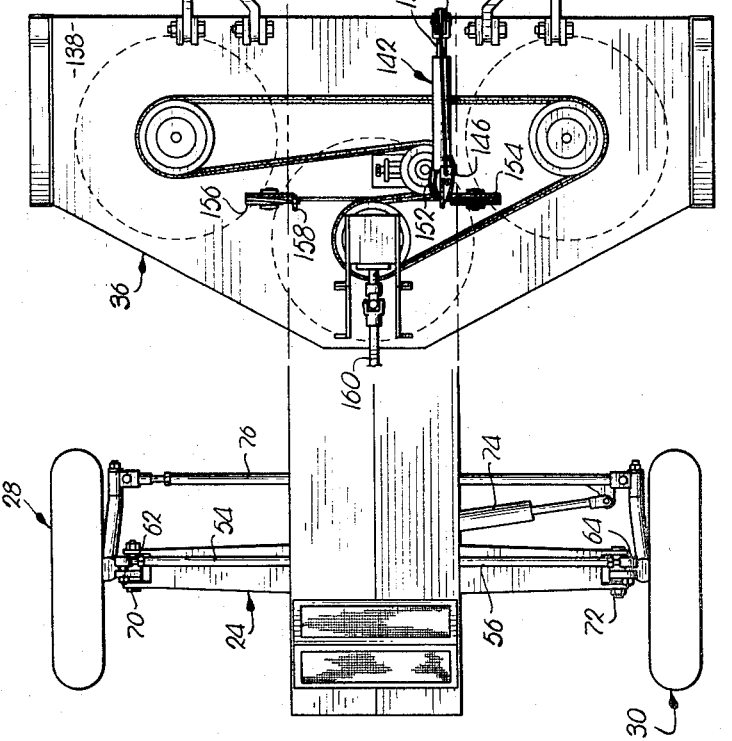
FIG. 4 is an enlarged, fragmentary, vertical sectional view through the front end of the vehicle showing the power train for the mower unit and the front axle mounting.

Particularly referring to the front axle 24, as best shown in FIGS. 2, 3 and 4 of the drawings, the axle 24 is normally disposed in a horizontal plane and is connected to the body through pivot member 42. The axle 24 is connected, at its midpoint, to a rotatable sleeve 46 which is carried by a rod 48, the rod 48 spanning the distance between, and being secured to, a front plate assembly 50, which is a part of the body 22, and a rear plate assembly 52 which likewise is a part of the body 22. As is apparent from FIG. 3 of the drawings, the axle 24 is free to swing about pivot member 42 to accommodate itself to the incline of the slope.

The front end of the vehicle 20 is also provided with a pair of tie bars 54 and 56, said tie bars being pivotally attached to the body at points 58 and 60 respectively, whereby to be shiftable with respect to the body. The outer ends of tie bars 54 and 56 are pivotally attached, as at 62 and 64, to steering knuckles 66 and 68 which are a part of front wheel assemblies 28 and 30 respectively. The outer ends of front axle 24 are likewise pivotally attached, as at points 70 and 72, to wheel assemblies 28 and 30 respectively, it being recognized that axle 24 and tie bars 54 and 56 cooperate to define a parallelogram-type framework for shiftably supporting the wheel assemblies 28 and 30. If the vehicle is provided with power steering, a cylinder 74 is normally carried by front axle 24, the same being coupled with a steering arm 76, also carried adjacent the front axle 24 of the vehicle and interconnecting wheel assemblies 28 and 30, it being noted that the front wheels 28 and 30 are the steering wheels of the vehicle, while the rear wheels 32 and 34 are the driven wheels.

Figure 9:
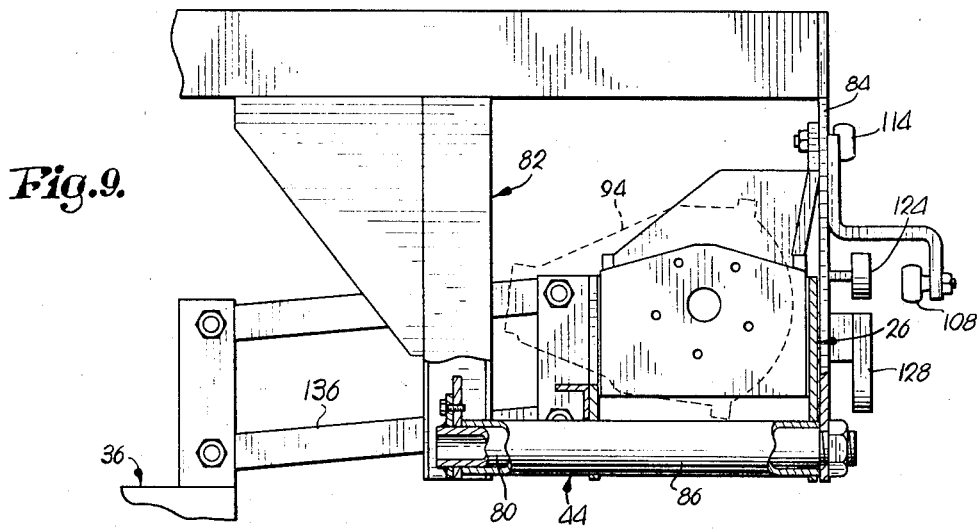
FIG. 9 is a fragmentary, enlarged, vertical, sectional view of the rear end of the vehicle.

The rear axle member 26 is best shown in FIGS. 6–11 of the drawings, the same being pivotally carried by the body 22 through pivot member 44 whereby the rear axle 26 may freely rock with respect to the body 22. The specific assembly for pivotally mounting rear axle 26 is best shown in FIG. 9 and consists of a fixed shaft 80 spanning the distance between a brace member 82 which is connected to the body 22, and a plate 84 which is likewise connected to the vehicle body 22. A rotatable sleeve 86 surrounds fixed shaft 80, and axle 26 is secured to rotatable sleeve 86 whereby to permit the swinging of axle 26 with respect to body 22.

Figure 10:
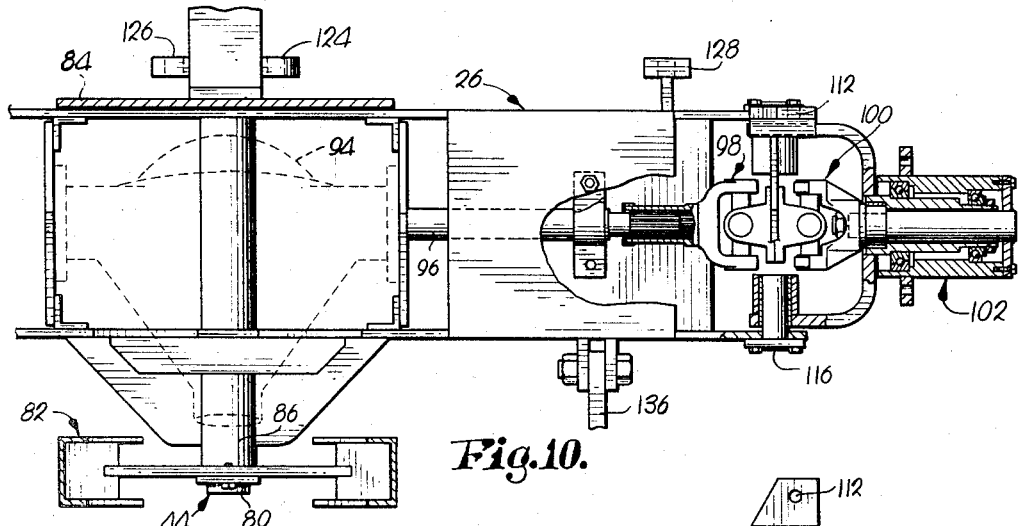
FIG. 10 is a fragmentary, enlarged sectional view of one-half of the rear axle member.
Figure 11:
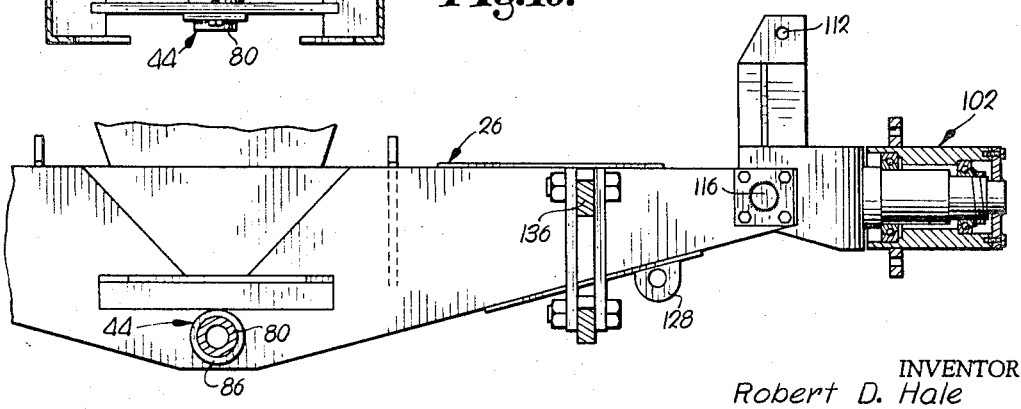
FIG. 11 is a fragmentary front elevational view of the rear axle.

Rear axle member 26 carries the power train assembly for driving rear wheels 32 and 34, the power train assembly consisting of a gearbox 88 which is suitably coupled to the engine 90 of the vehicle, the gearbox 88 being connected by a power takeoff coupling member 92 to the differential 94 as shown, for instance, in FIGS. 1, 9 and 10. The differential 94 has extending therefrom a pair of driven stub axles 96, only one of the same being shown in detail inasmuch as each side of the power train is identical. Stub axles 96 are coupled with a first universal joint 98 which, in turn, is connected to a second universal joint 100, the latter then being connected to the hub 102 of the wheel assembly whereby to transmit power thereto. The provision of double universal joints 98 and 100 for each rear wheel assembly 32 and 34 is an important feature inasmuch as the wheel assemblies 32 and 34 will change positions during the operation of the vehicle on a slope, the wheel assemblies 32 and 34 shifting from an inclined position to a vertical position during operation of the vehicle. Thus, the provision of a double universal joint such as 98 and 100 accommodates for the shifting of the wheel assemblies 32 and 34 and insures that power is uniformly delivered to each wheel assembly to thereby maintain uniform, continuous driving of the wheel assemblies and, therefore, vehicle 22.

Viewing FIGS. 6–8, it will be seen that the rear end of the vehicle is provided with a pair of tie bars 104 and 106, said tie bars having their inner ends pivotally attached to a bracket carried by the vehicle body as at 108 and 110 respectively, and their outer ends pivotally attached to wheel assemblies 32 and 34 as at pivot points 112 and 114 respectively. Likewise, the outer ends of rear axle 26 are also pivotally attached to corresponding wheel assemblies as at point 116 in the case of wheel assembly 32, and as at 118 in the case of wheel assembly 34.

It is important to note that the points of pivotal connection of the outer ends of tie bars 104 and 106, and the point of pivotal connection of the outer ends of axle 26, as at 116 and 118 are, in a given wheel assembly, in substantially vertical alignment and are disposed in a vertical plane coincident with the vertical center line of the corresponding wheel assembly. This positioning of the pivot points permits the parallelogram-type assembly, as above described, to maintain the mower unit 36 in a position parallel with the surface 40 of the slope upon which the vehicle is working. It will be appreciated that if the pivot points 116 and 118 were spaced inwardly from the center line of the tires, a geometric reaction would occur, causing the mower unit 36 to assume a position out of parallel relationship with the surface 40 whereby one side of the mower unit would tend to be too high from the surface 40 and the other side would be too low, causing undesired engagement of the mower unit 36 with the surface 40 and uneven mowing.

Accordingly, it is important to satisfactory operation of the mower unit 36 that the pivot points 112 and 116 in wheel assembly 32 and the pivot points 114 and 118 in wheel assembly 34 be aligned in a substantially common vertical plane, which plane is coincident with the center line of the corresponding wheel assembly.

When the vehicle 20 is moved onto a slope, the front axle 24 and the rear axle 26 will swing about their corresponding pivot members 42 and 44 to assume a position substantially as shown in FIG. 8 of the drawings. When this is done, the tie bars 54 and 56 for the front axle 24 and the tie bars 104 and 106 for the rear axle 26, cause the corresponding wheel assemblies 28, 30, 32 and 34 respectively to maintain a vertical position with respect to the slope, the geometry of the parallelogram type arrangements being such that greater weight is placed upon the tires on the uphill side of the vehicle when the axles assume their inclined position.

Once the axles have inclined to a position parallel with the surface of slope 40 and the body 22 thereby caused to assume a position inclined from vertical, the body 22 of the vehicle 20 may be rocked about the pivot members 42 and 44 by operation of tilting cylinders 120 and 122, which tilting cylinders are pivotally attached to the body 22 as at points 124 and 126 respectively at their inner ends, the outer ends of the tilting cylinders 120 and 122 being connected to axle 26 through corresponding brackets 128 to which the outer ends of the cylinders are pivotally attached as at 130 and 132 respectively. It will be apreciated that cylinders 120 and 122 are piped in a suitable manner so that fluid may be delivered thereinto whereby to extend the ram of one of the cylinders while retracting the ram of the other cylinder to thereby level the body 22, causing the operator, who is positioned in a seat 134, to be maintained in a vertical, normally upright position. As is apparent from FIGS. 4 and 9, rocking or swinging of the body to a vertical position, under the urging of cylinders 120 or 122, is possible inasmuch as the body is fixedly connected to rod 48 and shaft 80 which are rotatable within their corresponding sleeves 46 and 86, the sleeves being secured to corresponding axle members 24 and 26. As the vehicle is moved off of the sloping surface the fluid delivery assembly for the cylinders 120 and 122 may be further actuated whereby to again rock or swing the body 22 about its pivot members 42 and 44, in the manner described above, and thereby maintain the body in a vertical position at all times.

As hereinabove pointed out, the mower unit 36 is carried beneath body 22 of vehicle 20 in such a manner as to insure that mower unit 36 is always maintained in a position parallel to the surface 40. To this end, linkage members 136 of the parallel bar type extend between upper surface 138 of the mower unit 36 and the rear axle 26. Members 136 are connected to the mower 36 and rear axle 26 so as to be swingable in a vertical plane, sway braces 140 being provided as shown to restrict the lateral movement of members 136. Said linkage members 136 are secured to rear axle 26 at spaced-apart points whereby, when axle 26 is tilted, the movement thereof will be imparted through links 136 to mower unit 36 to thereby cause the same to swing with the axle 26 and, therefore, be maintained in parallel relationship to the surface 40, all as best shown in FIG. 8 of the drawings.

To further insure the stability and proper positioning of mower unit 36, there is provided suspension apparatus 142, best shown in FIGS. 1 and 2 of the drawings. The suspension apparatus 142 consists of a flexible carrying member in the nature of a cable 144 or the like which is secured to the body 22 at a point 146 on one side of the longitudinal center line thereof, the member 144 then extending rearwardly over a pulley 148 which is carried by a shiftable hydraulic ram 150 and thence forwardly over a pulley 152 carried by the body. Member 144 then extends downwardly, in perpendicular relationship to mower unit 36, passes beneath a pulley 154, carried on surface 138 and disposed on one side of the center line of body 22 and mower 36, thence across surface 138 and under pulley 156, on surface 138 and disposed equidistantly on the opposite side of the center line of body 22 and mower 36 and thence upwardly to a point 158 of reattachment to body 22.

From the foregoing it will be appreciated that, upon actuation and reciprocation of the hydraulic ram 150, the member 144 can be lengthened or shortened to thereby raise or lower mower unit 36 to which it is connected and which is suspended therefrom, all to the end that mower unit 36 may be shifted in its cutting positions or raised sufficiently high to permit roading of the vehicle 22.

The hydraulic ram 150 is suitably provided with a source of fluid under pressure so that, by actuation of a lever within the reach of the operator of the vehicle, the suspension assembly 142 may be readily and easily actuated to thereby control the position of mower unit 36 with respect to surface 40. As noted above, the manner of connection of flexible member 144 to mower unit 36 and the way in which the cable is suspended from the body, as at spaced-apart points 146 and 158, serve to maintain the mower unit 36 in its desired parallel relationship to the surface 40. Power for the mower unit 36 is delivered from the engine 90 of the vehicle through a power takeoff 160 as is best shown in FIGS. 1 and 4.

Thus, there is provided a vehicle 20 which has a mower unit 36 carried thereby in such a manner that the vehicle may be operated to mow slopes in such a manner that an even cutting of the vegetation on the slope is achieved as a result of the manner in which the mower is mounted on the vehicle, but yet the operator of the vehicle is able to maintain a normal, vertical position on the vehicle seat inasmuch as the body portion thereof is maintainable in such a vertical position.

Having thus described the invention, what is claimed as new and desired to be secured by Letters Patent is:

1. A vehicle for mowing slopes comprising:
   a longitudinally disposed body;
   front and rear axle members positioned transversely of said body;
   a wheel assembly carried at the outer ends of each axle member;
   pivot means connecting the body with each axle member at substantially the center of the latter to permit relative swinging movement of said axle members and said body;
   a mower unit carried beneath said body and between said axle members; and
   linkage means coupling the mower unit with one of said axle members at points spaced outwardly from said center of the latter for imparting corresponding tilting movement to the mower unit when said one axle member is tilted during operation of the vehicle on a slope whereby to retain said mower unit in a plane generally parallel to that of said one axle member and the surface of the slope.

2. A vehicle for mowing slopes as set forth in claim 1, there being means interconnecting the body and said one axle member to swing said body about said pivot means whereby to maintain said body in a vertical position notwithstanding the tilting of said axle members during operation of the vehicle on a slope.

3. A vehicle for mowing slopes as set forth in claim 1, said linkage means each including a pair of link members, said link members being vertically swingable, there being suspension apparatus coupled with said mower unit for shifting the same in a vertical path.

4. A vehicle for mowing slopes as set forth in claim 3, said suspension apparatus including a carrying member connected to said mower unit and fluid power means carried by the body above the mower unit and connected with said carrying member to shift the latter and thereby move said mower unit in a vertical path.

5. A vehicle for mowing slopes as set forth in claim 2, said means for swinging the body to a vertical position comprising a pair of piston and cylinder assemblies, the assemblies each being pivotally connected to the body adjacent the longitudinal center line thereof and extending outwardly in opposite directions therefrom, the outer ends of the assemblies each being pivotally connected with the rear axle member at points adjacent a corresponding wheel assembly carried thereby.

6. A vehicle for mowing slopes as set forth in claim 5, said wheel assemblies being pivotally carried at the outer ends of each axle member whereby, when said axles are inclined said wheel assemblies will remain in a vertical position.

7. A vehicle for mowing slopes as set forth in claim 6, said one axle member being the driven axle, there being a double universal joint coupling each outer end of said one axle member with its corresponding wheel assembly.

8. A vehicle for mowing slopes as set forth in claim 6, there being a pair of tie bars corresponding to each axle member, the inner ends of each tie bar being pivotally attached to the body adjacent the longitudinal center line of the body, the outer ends of each tie bar being pivotally attached to a corresponding wheel assembly, the pivot points for the inner ends of the tie bars corresponding to the front axle member being in substantial longitudinal alignment with the pivot points for the inner ends of the tie bars corresponding to the rear axle member, the pivot means connecting the body with each axle member being spaced below the pivot points for the inner ends of the tie bars corresponding to each axle.

9. A vehicle for mowing slopes as set forth in claim 8, the pivot point of the outer end of the rear axle member and the pivot point of the outer end of the tie bar for each wheel assembly carried by the rear axle being in substantially the same vertical plane.

10. A vehicle for moving slopes as set forth is claim 9, said vertical plane being substantially coincident with the vertical center line of said wheel assembly.

References Cited
UNITED STATES PATENTS

| | | | |
|---|---|---|---|
| 2,622,894 | 12/1952 | Keeler | 280—95 |
| 2,801,511 | 8/1957 | Vogelaar | 56—209 |
| 2,821,059 | 1/1958 | Heitshu | 56—209 |
| 2,913,865 | 11/1959 | Carruthers | 56—209 |
| 2,924,928 | 2/1960 | Rhoades et al. | 56—25.4 |
| 2,949,004 | 8/1960 | Jones | 56—25.4 |
| 2,972,850 | 2/1961 | Ariens et al. | 56—25.4 |
| 3,160,221 | 12/1964 | Boone | 180—41 |
| 3,199,276 | 8/1965 | Hahn | 56—25.4 |
| 3,286,447 | 11/1966 | Grinwald | 56—208 X |

RUSSELL R. KINSEY, *Primary Examiner.*